United States Patent
Chen et al.

(10) Patent No.: US 12,018,475 B2
(45) Date of Patent: Jun. 25, 2024

(54) FACILITATED DETAILING FOR PRE-APPLIED WATERPROOFING MEMBRANES

(71) Applicant: GCP Applied Technologies Inc., Cambridge, MA (US)

(72) Inventors: Huhe Chen, Beijing (CN); Hongmei Ding, Beijing (CN); Lijun Xin, Beijing (CN); Robert A. Wiercinski, Lincoln, MA (US)

(73) Assignee: GCP Applied Technologies Inc., Alpharetta, GA (US)

( * ) Notice: Subject to any disclaimer, the term of this patent is extended or adjusted under 35 U.S.C. 154(b) by 1101 days.

(21) Appl. No.: 16/853,872

(22) Filed: Apr. 21, 2020

(65) Prior Publication Data
US 2020/0248446 A1 Aug. 6, 2020

Related U.S. Application Data

(63) Continuation of application No. 15/763,643, filed as application No. PCT/US2015/052814 on Sep. 29, 2015, now Pat. No. 10,655,322.

(51) Int. Cl.
*E04B 1/66* (2006.01)
*B05D 1/02* (2006.01)
(Continued)

(52) U.S. Cl.
CPC .............. *E04B 1/665* (2013.01); *B05D 1/02* (2013.01); *B05D 1/28* (2013.01); *B05D 3/0272* (2013.01);
(Continued)

(58) Field of Classification Search
CPC .. E04B 1/665; B05D 1/02; B05D 1/28; B05D 3/0272; B05D 5/10; B32B 5/022;
(Continued)

(56) References Cited

U.S. PATENT DOCUMENTS

| | | |
|---|---|---|
| 3,373,074 A | 3/1968 | D'Eustachio et al. |
| 3,741,856 A | 6/1973 | Hurst |

(Continued)

FOREIGN PATENT DOCUMENTS

| | | |
|---|---|---|
| CN | 86201127 | 12/1987 |
| CN | 1398945 | 2/2006 |

(Continued)

OTHER PUBLICATIONS

Copenheaver, Form PCT/ISA/210, International Search Report for PCT/US2015/052814, dated Dec. 18, 2015, 2 pages.

(Continued)

*Primary Examiner* — Daniel H Lee
(74) *Attorney, Agent, or Firm* — Joseph Rossi

(57) ABSTRACT

The invention provides a waterproofing membrane which does not require a removable release sheet but which nevertheless bonds to post-cast concrete and facilitates water-tight sealing at membrane-to-membrane overlaps. The waterproofing membrane comprises a carrier and pressure-sensitive adhesive (PSA) layers, an inorganic particle layer having particulate bodies which are partially embedded in the PSA and which have an average particle size less than the average thickness of the PSA layer, and an anti-submarining nano-silica-containing coating layer attached to un-embedded portions of the inorganic particles to prevent total embedding into the PSA when the membrane is rolled or unrolled, whereby water-tight seams are facilitated between overlapped portions of adjacently installed waterproofing membranes, and whereby the water-tight seam is achieved preferably using only detailing or waterproofing tape and without the additional use of a liquid primer, mastic, or other coating.

19 Claims, 3 Drawing Sheets

(51) Int. Cl.
*B05D 1/28* (2006.01)
*B05D 3/02* (2006.01)
*B05D 5/10* (2006.01)
*B32B 5/02* (2006.01)
*B32B 7/12* (2006.01)
*B32B 11/04* (2006.01)
*B32B 11/10* (2006.01)
*B32B 13/04* (2006.01)
*B32B 13/12* (2006.01)
*B32B 25/12* (2006.01)
*B32B 25/14* (2006.01)
*B32B 25/16* (2006.01)
*B32B 25/18* (2006.01)
*B32B 27/08* (2006.01)
*B32B 27/12* (2006.01)
*B32B 27/14* (2006.01)
*B32B 27/16* (2006.01)
*B32B 27/18* (2006.01)
*B32B 27/20* (2006.01)
*B32B 27/22* (2006.01)
*B32B 27/30* (2006.01)
*B32B 27/32* (2006.01)
*B32B 27/36* (2006.01)
*C09J 7/38* (2018.01)
*C08K 3/013* (2018.01)
*C08K 7/00* (2006.01)

(52) U.S. Cl.
CPC ............... *B05D 5/10* (2013.01); *B32B 5/022* (2013.01); *B32B 5/024* (2013.01); *B32B 7/12* (2013.01); *B32B 11/046* (2013.01); *B32B 11/10* (2013.01); *B32B 13/042* (2013.01); *B32B 13/12* (2013.01); *B32B 25/12* (2013.01); *B32B 25/14* (2013.01); *B32B 25/16* (2013.01); *B32B 25/18* (2013.01); *B32B 27/08* (2013.01); *B32B 27/12* (2013.01); *B32B 27/14* (2013.01); *B32B 27/16* (2013.01); *B32B 27/18* (2013.01); *B32B 27/20* (2013.01); *B32B 27/22* (2013.01); *B32B 27/304* (2013.01); *B32B 27/306* (2013.01); *B32B 27/308* (2013.01); *B32B 27/32* (2013.01); *B32B 27/322* (2013.01); *B32B 27/36* (2013.01); *C09J 7/38* (2018.01); *B32B 2250/03* (2013.01); *B32B 2255/04* (2013.01); *B32B 2255/26* (2013.01); *B32B 2262/0253* (2013.01); *B32B 2262/0261* (2013.01); *B32B 2262/0284* (2013.01); *B32B 2262/14* (2013.01); *B32B 2264/104* (2013.01); *B32B 2264/107* (2013.01); *B32B 2264/12* (2013.01); *B32B 2270/00* (2013.01); *B32B 2307/416* (2013.01); *B32B 2307/50* (2013.01); *B32B 2307/536* (2013.01); *B32B 2307/54* (2013.01); *B32B 2307/546* (2013.01); *B32B 2307/71* (2013.01); *B32B 2307/712* (2013.01); *B32B 2307/714* (2013.01); *B32B 2307/718* (2013.01); *B32B 2307/7246* (2013.01); *B32B 2307/7265* (2013.01); *B32B 2307/732* (2013.01); *B32B 2307/744* (2013.01); *B32B 2307/752* (2013.01); *B32B 2419/00* (2013.01); *B32B 2471/00* (2013.01); *C08K 3/013* (2018.01); *C08K 7/00* (2013.01); *C09J 2301/408* (2020.08); *C09J 2453/00* (2013.01); *C09J 2495/00* (2013.01)

(58) Field of Classification Search
CPC ......... B32B 5/024; B32B 7/12; B32B 11/046; B32B 11/10; B32B 13/042; B32B 13/12; B32B 25/12; B32B 25/14; B32B 25/16; B32B 25/18; B32B 27/08; B32B 27/12; B32B 27/14; B32B 27/16; B32B 27/18; B32B 27/20; B32B 27/22; B32B 27/304; B32B 27/306; B32B 27/308; B32B 27/32; B32B 27/322; B32B 27/36; B32B 2250/03; B32B 2255/04; B32B 2255/26; B32B 2262/0253; B32B 2262/0261; B32B 2262/0284; B32B 2262/14; B32B 2264/104; B32B 2264/107; B32B 2264/12; B32B 2270/00; B32B 2307/416; B32B 2307/50; B32B 2307/536; B32B 2307/54; B32B 2307/546; B32B 2307/71; B32B 2307/712; B32B 2307/714; B32B 2307/718; B32B 2307/7246; B32B 2307/7265; B32B 2307/732; B32B 2307/744; B32B 2307/752; B32B 2419/00; B32B 2471/00; C09J 7/38; C09J 2301/408; C09J 2453/00; C09J 2495/00; C08K 3/013; C08K 7/00
See application file for complete search history.

(56) References Cited

U.S. PATENT DOCUMENTS

| | | |
|---|---|---|
| 3,900,102 A | 8/1975 | Hurst |
| 4,172,830 A | 10/1979 | Rosenberg et al. |
| 4,215,160 A | 7/1980 | Rosenberg et al. |
| 4,239,795 A | 12/1980 | Haage et al. |
| 4,357,377 A | 11/1982 | Yamamoto |
| 4,556,595 A | 12/1985 | Ochi |
| 4,751,122 A | 6/1988 | May |
| 4,994,328 A | 2/1991 | Cogliano |
| 5,112,678 A | 5/1992 | Gay et al. |
| 5,204,148 A | 4/1993 | Alexander et al. |
| 5,206,068 A | 4/1993 | Kalkanoglu |
| 5,271,781 A | 12/1993 | Anno et al. |
| 5,316,848 A | 5/1994 | Bartlett et al. |
| 5,496,615 A | 3/1996 | Bartlett et al. |
| 5,543,188 A | 8/1996 | Te'eni |
| 5,824,401 A | 10/1998 | Jenkins et al. |
| 6,235,365 B1 | 5/2001 | Schaughency et al. |
| 6,500,520 B1 | 12/2002 | Wiercinski et al. |
| 6,632,509 B1 | 10/2003 | Davis et al. |
| 6,648,962 B2 | 11/2003 | Berke et al. |
| 6,660,326 B2 | 12/2003 | Sano et al. |
| 6,746,764 B2 | 6/2004 | Anspach |
| 7,771,807 B2 | 8/2010 | Hubbard |
| 7,968,171 B2 | 6/2011 | Seth et al. |
| 8,104,245 B2 | 1/2012 | Whelan et al. |
| 8,453,405 B2* | 6/2013 | Wiercisnki ............... C09J 7/22 428/150 |
| 8,475,909 B2 | 7/2013 | Seth et al. |
| 8,609,213 B2 | 12/2013 | Wiercinski et al. |
| 8,713,879 B2 | 5/2014 | Wiercinski et al. |
| 8,931,228 B2 | 1/2015 | Wiercinski et al. |
| 8,931,229 B2* | 1/2015 | Wiercinski ............... E04G 21/00 428/351 |
| 9,394,464 B2 | 7/2016 | Wiercinski et al. |
| 9,476,196 B2 | 10/2016 | Wiercinski et al. |
| 10,267,049 B2 | 4/2019 | Wiercinski et al. |
| 10,487,215 B2 | 11/2019 | Xiong et al. |

FOREIGN PATENT DOCUMENTS

| | | |
|---|---|---|
| CN | 102774057 | 4/2015 |
| CN | 104479580 | 8/2016 |
| EP | 0306727 | 3/1993 |
| GB | 2340070 | 2/2000 |
| JP | H0230841 | 2/1998 |
| WO | WO2000024970 | 5/2000 |
| WO | WO2005091931 A2 | 10/2005 |
| WO | 2014029763 | 2/2014 |

(56) References Cited

FOREIGN PATENT DOCUMENTS

OTHER PUBLICATIONS

Copenheaver, Form PCT/ISA237, Written Opinion of the International Searching Authority for PCT/US2015/052814, dated Dec. 18, 2015, 4 pages.

* cited by examiner

FACILITATED DETAILING FOR PRE-APPLIED WATERPROOFING MEMBRANES

CROSS-REFERENCE TO RELATED APPLICATIONS

This nonprovisional application is a continuation of U.S. Nonprovisional patent application Ser. No. 15/763,643, entitled "Facilitated Detailing for Pre-Applied Waterproofing Membranes", filed Mar. 27, 2018, which is a § 371 national stage application of PCT Patent Application No. PCT/US2015/052814, entitled "Facilitated Detailing for Pre-Applied Waterproofing Membranes", filed Sep. 29, 2015, both of which are incorporated herein by reference in their entireties.

FIELD OF THE INVENTION

The present invention relates to a waterproofing membrane that bonds to post-cast concrete, the membrane comprising carrier and pressure-sensitive adhesive (PSA) layers, inorganic particle layer of restricted particulate size partially embedded into the PSA, and an anti-submarining outer coating layer comprising nano-silica and film-forming polymer for preventing total embedding of particles into the PSA layer, for providing anti-blocking to obviate need for a release liner, and for facilitating water-tight seams using a detailing or waterproof tape between overlapped membranes at installation.

BACKGROUND OF THE INVENTION

U.S. Pat. Nos. 8,453,405 and 8,713,897 of Wiercinski et al. (owned by the common assignee hereof) disclose a waterproofing membrane which is "pre-applied" by mounting it onto a building, form, or other surface, and then casting fresh concrete ("post-cast concrete") against its adhesive layer side. The membrane design of Wiercinski et al. involves the use of a carrier sheet, a pressure sensitive adhesive (PSA), and white cement particles having particle size equal to or greater than the thickness of the PSA, such that a release sheet is not required for preventing PSA from sticking to the carrier sheet side when the membrane is rolled and unrolled. The absence of release sheet means that waste is avoided at the construction site. Eliminating the release liner means easier, faster application.

However, the present inventors believe that "pre-applied" membranes have a disadvantage. Because such membranes are installed with carrier layers facing against the installation surface (e.g., a wood form, a concrete mold), the outwardly-disposed particle-containing layers are facing towards the carrier layer of subsequently installed membranes which are overlapped at ends (side edges are sealed with 3" PSA selvedge) to achieve monolithic protection in combination with a previously installed (adjacent) membrane. For applicators, this particles-to-carrier overlap requires extra caution, time, and effort during detailing. Sealant adhesives or mastic coatings together with suitable detailing or waterproofing tape (or strip) are usually required to ensure formation of a watertight seam along the overlapped edges of adjacent membranes.

Accordingly, the present inventors believe that a novel and inventive pre-applied-type waterproofing membrane is needed to ensure sealing and facilitate detailing at overlaps.

SUMMARY OF THE INVENTION

In surmounting the disadvantages of the prior art, the present invention provides a novel and inventive pre-applied waterproofing membrane which facilitates detailing treatment in terms of achieving a water-tight seam at overlapped edges of adjacent membranes on the building surface; and which furthermore does not require a removable release liner for rolling and unrolling, which provides durability and skid resistance for foot traffic, and which provides good bonding to post-cast concrete (including excellent initial bond strength), even after the membrane has been subjected to UV and moisture for extended periods.

An exemplary waterproofing membrane of the present invention, comprises: a carrier layer comprising two major faces; a pressure-sensitive adhesive (PSA) layer having an average thickness of 0.05 to 2.0 mm as defined between two major faces, one of which is attached to one of the carrier layer major faces, the PSA layer further having a has a penetration greater than 30 decimillimeters (dmm) (150 g., 5 sec., 70° F.) as measured according to ASTM D 5-73; an inorganic particle layer comprising individual particulate bodies having an average size of 70 μm to 450 μm, the inorganic particle layer being formed by partially embedding the particulate bodies into the second major face of the PSA layer (opposite the major face attached to the carrier layer) whereby a portion of the particulate bodies remain un-submerged relative to the PSA; and an anti-submarining coating layer, having an average thickness of 0.003 to 0.011 mm, attached to un-submerged portions of the inorganic particulate bodies to prevent total embedding of individual particulate bodies within the PSA layer when the membrane is rolled up or unrolled, the coating layer being formed by coating the inorganic particle layer with an emulsion comprising nano-silica particles and at least one film-forming polymer and allowing the coating layer to dry upon the un-submerged individual particulate bodies, the anti-submarining nano-silica coating layer after drying having a Shore D hardness in the range of 50-90, more preferably in the range of 60-90, and most preferably in the range of 70-90, measured at 23 degrees Celsius, in accordance with ASTM D 2240-00.

Preferably, the ratio of the at least one film forming polymer to nano-silica in the anti-submarining coating layer should preferably be in the range of 1:4 to 4:1 based on dry weight percentage, and the dry coating thickness of this coating layer upon the inorganic particle layer should be 0.004 to 0.008 mm.

An exemplary method of the invention for making a monolithic membrane course thus comprises: mounting a first waterproofing membrane as described above onto a first portion of a substrate (e.g., form, wall, etc.); mounting a second waterproofing membrane onto a second portion of the substrate while partially overlapping the first waterproofing membrane, and sealing (e.g., detailing) between a carrier layer major face of the second waterproofing membrane and the anti-submarining nano-silica-containing coating layer of the first waterproofing membrane, whereby a water-tight overlap is created between the first and second (installed) membranes while still affording excellent bonding (including initial bonding strength) with post-cast concrete.

The present invention instills much greater confidence, compared to pre-applied type membranes of prior art designs, that an effective membrane-to-membrane sealing is achieved (at the overlap), even when using a detailing or waterproofing tape alone (i.e., a strip having pre-formed waterproof pressure-sensitive adhesive layer or double-sided layers without further aid of liquid primer, sealant, or other coating material) to create a water-tight seam at the overlapped portions of the membranes.

The present invention also provides a method for making the above-described membrane. An exemplary membrane comprises coating the partially non-embedded portions of the inorganic particles with an aqueous emulsion comprising colloidal silica and at least one film-forming polymeric emulsion, and allowing the coating to dry, whereby an anti-submarining nano-silica-containing coating layer is formed. In preferred embodiments, the membrane may be rolled and unrolled without the need to use a removable release liner (e.g., waxed or siliconized paper).

As will be explained using micro-photography hereinafter, the use of the aqueous emulsion coating layer in combination with the restricted size particle layer provides a controlled "flatter" outward face portion which advantageously allows a waterproofing or detailing tape (e.g., waterproofing strip having preformed waterproofing pressure-sensitive adhesive layer on one or both sides, either folded over lengthwise or laid flat lengthwise) to be used when forming a waterproof seal at the overlap between two adjacently installed membranes on the building or construction surface; and this is preferably done without having to use an additional liquid primer, mastic, or other liquid coating composition. At the same time, the membrane has sufficient anti-blocking properties such that a release sheet is not required to roll the membrane up (prior to shipment) and to unroll the membrane (before application onto the surface).

Further advantages and features of the invention are described in detail hereinafter.

BRIEF DESCRIPTION OF THE DRAWINGS

Further advantages and features of the present invention may be more readily comprehended when the following detailed description of preferred embodiments is taken in conjunction with the appended drawings wherein.

DETAILED DESCRIPTION OF THE PREFERRED EMBODIMENTS

Figure 1:
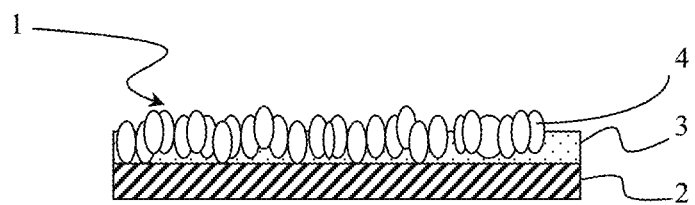
FIG. 1 is an illustration (not drawn to scale) of the cross-section of a pre-applied waterproofing membrane having carrier sheet, pressure-sensitive adhesive (PSA) layer, and white cement particle layer having an average size equal to or larger than the average thickness of the PSA layer.

FIG. 1 illustrates a cross-section of a PRIOR ART pre-applied waterproofing membrane 1, such as originally disclosed in U.S. Pat. Nos. 8,453,405 and 8,713,897 (See Background Section), which comprises a flexible carrier sheet 2, pressure-sensitive adhesive (PSA) layer 3, and reflective particle layer 4 on the surface of the PSA layer 3. The reflective particles 4 have an average diameter equal to or greater than the thickness of the PSA layer 3. The membrane 1 does not require a removable release sheet that is typically used to prevent the adhesive portion 3 of the membrane 1 from adhering to the carrier sheet 2 or other portion of the membrane 1 when the membrane is rolled up.

Figure 2:
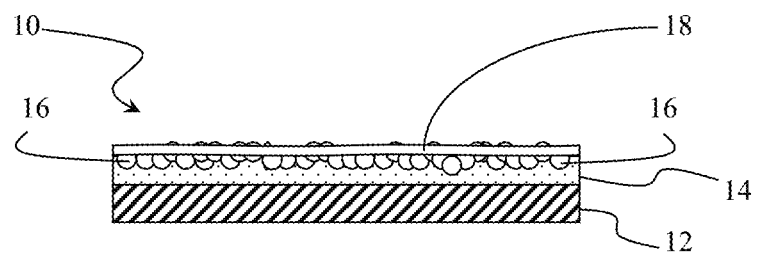
FIG. 2 is an illustration (also not drawn to scale) of the cross-section of an exemplary pre-applied waterproofing membrane of the present invention having carrier sheet, PSA layer, inorganic particles which have an average size that is less than the average thickness of the PSA layer and which are partially-embedded in the PSA layer, and an anti-submarining nano-silica-containing coating layer attached to inorganic particles portions which are not embedded in the PSA layer.

In contrast, FIG. 2 illustrates an exemplary pre-applied waterproofing membrane 10 of the present invention which comprises a flexible carrier layer 12 having two major faces; a pressure-sensitive adhesive layer (PSA) 14 having two major faces, one major face of which is attached to one of said carrier layer 12 major faces; an inorganic particle layer 16 having individual particulate bodies which have an average size (diameter) that is less than the average thickness of the PSA layer 14 and which are partially-embedded into the PSA layer 14 opposite the major face which is attached to the carrier layer 12; and an anti-submarining coating layer 18 which is formed upon the portion of the un-embedded particulate bodies 16. Preferably, the anti-submarining coating layer 18 is formed by coating onto the exposed individual particulate bodies of the inorganic particulate layer 16 at least one aqueous emulsion composition 18 which is made up of a colloidal (nano-)silica and at least one polymeric film forming material, and allowing the coating layer 18 to dry.

Figure 3:
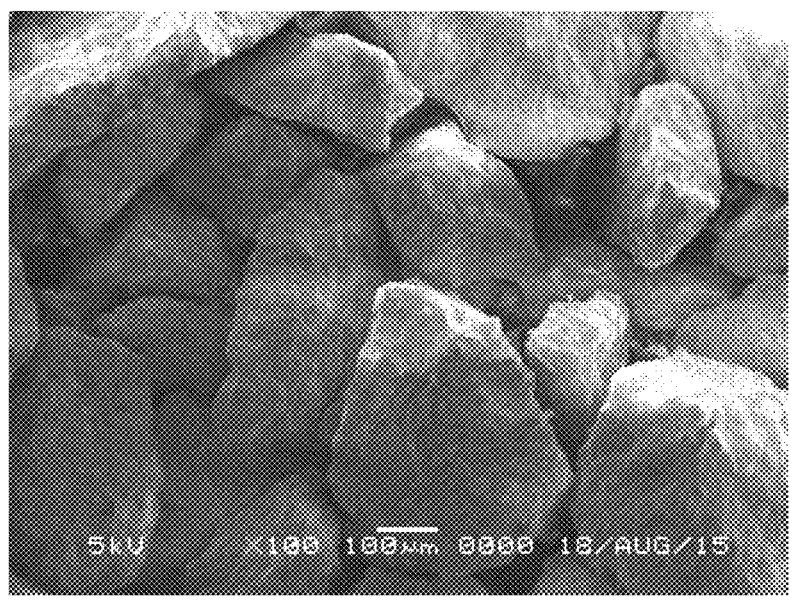
FIG. 3 is a microphotograph, taken by scanning electron microscope (SEM) at 100× magnification, of the white cement particle layer of the PRIOR ART waterproofing membrane whose cross-sectional design was illustrated in FIG. 1.

As depicted in the scanning electron microscope (SEM) photograph seen in FIG. 3 (PRIOR ART), the reflective particles of the prior art waterproofing membrane design (whose cross-sectional design is illustrated in FIG. 1) protrude significantly out of the PSA layer. The SEM photograph of FIG. 3 is taken at 100× magnification. It is readily apparent that the reflective particles provide rugged surface area for resisting foot traffic when the membrane is installed, as well as certain anti-blocking benefits (so that the carrier side can be rolled against the particle size without the need to use a removable release sheet to permit unrolling of the membrane).

Figure 4:
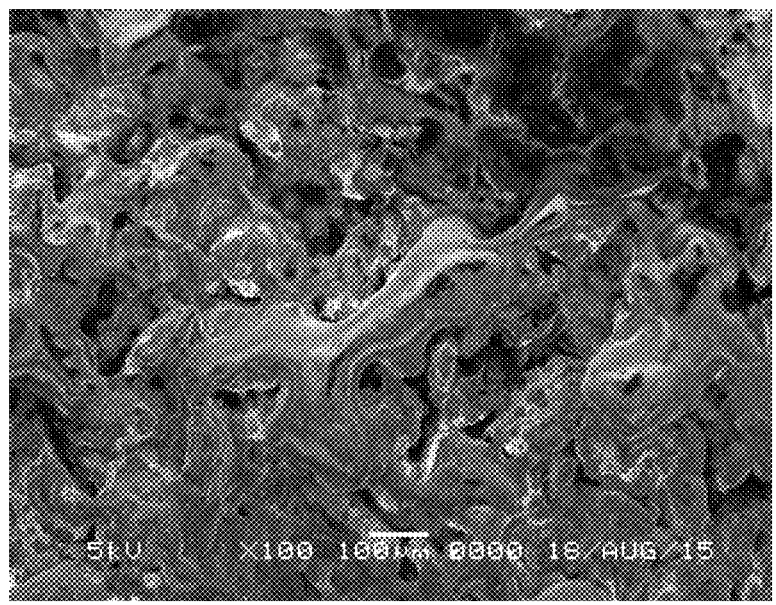
FIG. 4 is a microphotograph, also taken by SEM at 100× magnification, of an exemplary waterproofing membrane of the present invention, wherein an anti-submarining nano-silica-containing coating layer is formed on restricted-size inorganic particles, which are partially embedded in the PSA layer, using an aqueous emulsion comprising colloidal nano-silica and film-forming polymer, whereby the emulsion was allowed to dry to form a coating that attaches to the particles and functions to minimize or prevent total embedding (or submergence) of the restricted-size inorganic particles into the PSA layer when the membrane is rolled and unrolled.

On the other hand, FIG. 4 depicts an SEM photograph taken at the same magnification (100×) of an exemplary pre-applied waterproofing membrane of the present invention, wherein the anti-submarining nano-silica-containing coating layer, designated at 18 in FIG. 2, is shown to have coated inorganic particulate bodies which define the inorganic particle layer designated at 16 in FIG. 2. As previously described, this coating layer 18 is preferably formed by coating onto the exposed portions of the particulate bodies 16 an aqueous emulsion comprising colloidal (nano-)silica and at least one film-forming polymeric material, as will be further discussed in detail hereinafter. The terms "(nano-) silica," "nano-silica," "nano-size silica," and "nano-scale silica" may be used interchangeably herein to refer to silica particles (i.e., having an average size of 0.1 to 100 nanometers (nm)) contained within the anti-submarining nano-silica coating layer 18. An aqueous dispersion of nano-silica is commonly referred to as colloidal silica.

The present inventors, without intending to be bound to theory, believe that the anti-submarining nano-silica-containing coating layer 18 helps to prevent or to minimize total submergence (sinking) and total embedding (encapsulation) of the inorganic particulate bodies 16 into the PSA layer, particularly in hot weather when the PSA may be softened by the energy of sunlight. Smaller particles 16 with smaller average diameters may be used (compared the average thickness of the PSA layer) without defeating the anti-blocking effect of the particles and without sacrificing durability such as resistance to foot traffic. Yet, quite advantageously and surprisingly, the anti-submarining nano-silica coating layer 18 can be used to enable good initial bonding to post-cast concrete, and this effect can be perhaps best explicated with reference to the microphotograph of FIG. 4 which shows that the coating 18 has attached to much of the exposed (un-submerged portion of the) particles 16 while still leaving crevices or openings for post-cast concrete to key into for good initial bonding with the membrane.

As suggested by FIG. 4, the decrease in the overall surface area of particles (compared to the PRIOR ART large exposed particles shown in FIG. 3) also suggests the benefits to be obtained when using a detailing or waterproofing tape (or strip) alone, preferably without additional use of liquid primer, mastic, or other liquid coating material, to seal together adjacently installed membranes which are overlapped at edges at the application site. The creation of a monolithic barrier formed of two or more waterproofing membranes of the invention, using only a detailing or waterproofing tape, can be achieved with much greater confidence and speed.

Conventional waterproofing, detailing, or joining tapes (or strip membranes) may be used for sealing together adjacent sheet membranes, such as sold by Grace Construction Products (see e.g., PV100™ tape, BITUTHENE® tape). Many waterproofing manufacturers sell waterproofing tapes, and these adhesives can be made of bituminous or synthetic polymer waterproofing adhesive, and would be suitable for use in the present invention. Preferably, the waterproofing tape is double-sided in that both sides of a carrier film or fabric bear a preformed waterproof pressure-sensitive adhesive layer, such that it can be intercalated between overlapping edges of adjacent membranes without needing to fold the tape lengthwise.

It also is believed by the present inventors that the membrane design of the present invention allows for greater flexibility in the selection of laminate components.

Exemplary flexible carrier layers 12 most suitable for the present invention should provide mechanical strength and waterproofing integrity for the membrane 10. The carrier layer 12 typically will have a thickness of about 0.05 to 2.0 mm, and, more preferably, about 0.3 to 1.0 mm. The carrier layer 12 should further have a generally smooth surface, such as is provided by films, sheets, fabrics, and extrusion coated woven or non-woven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC), polyamides and combinations thereof. Polyethylene and polypropylene are preferred. A preferred carrier layer 12 comprises a thermoplastic film of high density polyethylene (HDPE). Fabrics may be woven or non-woven and may comprise polyethylene, polypropylene, polyethylene terephthalate and polyamide. A woven polypropylene fabric is particularly suitable.

Generally, the carrier layer or sheet 12 is not surface treated to increase the surface tension. However, in some cases it may be desirable to treat the surface of the carrier sheet 12 on which the adhesive 14 will be applied in order to enhance adhesion of the adhesive layer 14 to the carrier sheet 12. An example of a surface treatment is corona treatment.

Additives may be incorporated into the carrier layer 12 material to reduce surface tension. These may be incorporated into the bulk of the material in a separate compounding step. The additives may also be incorporated into the bulk of the material during the melt extrusion process to produce a sheet, film, or extrusion coated fabric.

An exemplary pressure-sensitive adhesive (PSA) layer 14 most suitable for the present invention should provide waterproofing integrity for the waterproofing membrane 10. The PSA layer 14 functions to bond the inorganic particle layer 16 to the carrier sheet 12, and should preferably have a thickness of about 3 to 30 mils, more preferably about 5 to 15 mils, and most preferably about 8 to 10 mils. While it is contemplated that the use of a bituminous or rubber-modified bituminous adhesive can be used satisfactorily in certain waterproofing applications (e.g., tunnel or other low-light applications), the present inventors much prefer that the waterproofing adhesive used in the PSA layer 14 comprise a synthetic (non-bituminous) pressure-sensitive adhesive. The use of bituminous pressure sensitive adhesive is not preferred for the present invention, because such material tends to exhibit poor degradation resistance and rapid loss of bond to concrete after UV exposure. Thus, for improved adhesion to post-cast concrete, it is preferred that the pressure-sensitive adhesive comprise a synthetic polymer and have a penetration greater than about 30 decimillimeters (dmm) (150 g, 5 sec., 70° F.) as measured according to ASTM D 5-73.

Exemplary pressure-sensitive adhesive layers 14 which are believed to be suitable include butyl rubber based adhesive, polyisobutylene based adhesive, butyl based adhesive, acrylic based adhesive, styrene-isoprene-styrene (SIS) based adhesive, styrene-ethylene-butylene-styrene (SEBS) based adhesive, styrene-butadiene-styrene (SBS) based adhesive, styrene-butadiene rubber (SBR) based adhesive, and combinations thereof. Preferably, the synthetic adhesive is a pressure sensitive hot melt adhesive block copolymer of SIS, SBS or SEBS. For a more detailed description of pressure sensitive adhesives, See Satas, *Handbook Of Pressure Sensitive Adhesive Technology*, (Van Nostrand Reinhold Company, Inc., 1982).

Rubbers or elastomers which are suitable for use in the PSA layer 14 include polyisoprene, polybutadiene, natural rubber, polychloroprene rubber, ethylene-propylene rubber, ethylene alpha olefin, nitrile rubber, acrylic rubber, or mixtures thereof.

Preferred non-bituminous, synthetic pressure-sensitive adhesive layer 14 can optionally contain additives which are typically used in waterproofing membranes, including, without limitation, light absorbers (e.g., carbon black, benzotriazoles, etc.), light stabilizers (e.g. hindered amine, benzophenone), antioxidants (e.g. hindered phenol), fillers (e.g., calcium carbonate, silica, titanium dioxide, etc.), plasticizers, rheological additives, and mixtures thereof. Preferred combinations are synthetic PSA composition layer comprising light absorber, light stabilizer, antioxidant, or mixtures thereof. In further exemplary embodiments of the invention, one of these optional additives may be included in the anti-submarining nano-silica coating layer 18 as well.

Another example of pressure-sensitive adhesive (PSA) 14 includes one or more amorphous polyolefins. An amorphous polyolefin (APO) is defined as a polyolefin with a degree of crystallinity of less than 30% as measured by differential scanning calorimetry. These polymers can be either homopolymers of propylene or copolymers of propylene with one or more α-olefin comonomer, such as, for example, ethylene, 1-butene, 1-hexene, 1-octene and 1-decene. The APO polymers of the types herein described above are commercially available from Eastman Chemical Company, Kingsport, Tennessee, under the trade name designation EASTOFLEX™ or from Huntsman Corporation, Houston, Texas, under the trade name designation REXTAC™ or from Degussa Corporation, Parsipanny, New Jersey, under the trade name designation VESTOPLAST™. Like rubber-based adhesives, the polymers are also combined using a tackifier and plasticizer to produce a PSA composition which can be coated onto the carrier layer 12 or which can be a pre-formed layer 14 that can be laminated (nipped or extruded) onto the carrier sheet 12. See e.g., Eastman bulletin "Pressure-Sensitive Adhesives Based on Amorphous Polyolefin From Eastman Chemical Company." Although less preferred, bituminous PSA materials, including compositions modified with rubber and/or other additives, may also be hot-melt coated or laminated as a pre-formed layer onto a carrier layer or sheet.

The inorganic particle layer 16 of the invention comprise one or more materials, such as partially hydrated cement, hydrated cement, calcium carbonate, silicate sand, sand, amorphous silica, slag, alumina trihydrate, bottom ash, slate dust, granite dust, and the like. Preferred particulates include cement, partially hydrated cement, and hydrated cement; while more preferred particulates include white cementitious particles; and most preferred particulates are hydrated cementitious particles.

As previously discussed, the average size of the individual particulate bodies is less than the average thickness of the pressure sensitive adhesive (PSA) layer 16. The fine inorganic particle layer 16 has several functions and advantages, as it should bond well to both the underlying PSA layer 14 and to the overlying anti-submarining nano-silica coating layer 18. Furthermore, these particles keep the membrane 10 cooler and block damaging UV exposure, thus minimizing the rate of degradation of the PSA layer 14. The particles 16 also prevent blocking and eliminate the need for a removable release liner (e.g., wax or siliconized paper), the removal of which creates waste as well as an extra step during installation. The particles (16) also can improve skid resistance of the membrane 10 as well as traffic-ability (durability for foot traffic) of the membrane 10 during installation.

While it is most preferred to use hydrated or partially hydrated white cement particulates in the inorganic particle layer 16, the use of relative smaller particle sizes in relation to PSA layer thickness and the use of the nano-silica coating layer 18 to minimize submarining (total embedding) of the particles 16, provides greater flexibility for regions where other inorganic materials, which are not as light-reflective as hydrated or partially hydrated white cement particulates might be more readily available or more practical to employ.

In further exemplary embodiments of the invention, the anti-submarining coating 18 may further comprise titanium dioxide to improve the overall reflectivity of the waterproofing membrane 10. Reflectivity of the membrane surface may be gauged with a NOVO-SHADE™ 45/0 Reflectometer. This involves illumination of the test surface from a 45° angle, and measurement of the intensity of scattered light perpendicularly with respect to the surface (i.e. 0°). Data is recorded on a grey scale where black is 0% and white is 100%. Only shading is measured, irrespective of color, and the value of this shading is referred to in terms of "whiteness." In exemplary embodiments, the inorganic particle layer 16 should preferably have a light reflectivity that is greater than or equal to 55%, and, more preferably, greater than 65%.

In accordance with the present invention, the average size of the individual particle bodies of the inorganic particle layer 16 should be less than the average thickness of the PSA layer 14. The typical PSA layer thickness is about 3 to 80 mils, more preferably about 5 to 15 mils, and most preferably about 8 to 10 mils. The particulate size of the cement should preferably be in the range of 70 (to be less than lowest adhesive thickness which is 3 mils) to 450 μm; while a more preferred particulate size is in the range of 100 μm to 250 μm; and a most preferred particulate size range is in the range of 120 μm to 180 μm. As an example, hydrated white Portland cement particles, if used in the inorganic particle layer 16, are preferably produced by mixing white Portland cement with water using a water/cement (W/C) ratio of 0.22 to 0.5 W/C with a polymeric cement dispersant, and by allowing the cement to cure, preferably for seven days or more, followed by milling and sieving to achieve the appropriate range of particle sizes. Preferred cement dispersants are polycarboxylate polymer cement dispersants. Most preferred are ethylene oxide-containing polycarboxylates, such as those sold by Grace Construction Products, a business unit of W. R. Grace & Co.-Conn., 62 Whittemore Avenue, Cambridge, Massachusetts 02140 (USA) under the ADVA® and ADVA® 120. The level of dispersant used may be 0.1% to 1% active surfactant on dry cement.

Hydrated white cement particles may also be prepared using chemical admixture or admixtures depending upon the properties desired. The admixture is blended with the white cement and water. Various admixtures used in the present invention may comprise those which are conventionally used to achieve the following properties: (1) to enhance the bond of the membrane to concrete; (2) to accelerate the time of initial setting; (3) to accelerate the rate of strength development at early stages (of curing or hardening of the cement); (4) to increase the strength of the finished material (compressive, tensile or flexural); (5) to decrease the capillary flow of water within the material; (6) to decrease permeability of the material to liquids; and/or (7) to inhibit corrosion of embedded metal, such as used for protecting steel reinforcement bars or other structures within the concrete matrix.

Finally, as previously discussed, waterproofing membranes 10 of the present invention comprise at least one anti-submarining coating layer 18 which functions to fix or to secure the fine inorganic particle layer 16 to facilitate the establishment by the applicator of water-tight seams at the overlap between adjacent waterproofing membranes 10. In a preferred embodiment, the anti-submarining coating layer 18 comprises at least one film-forming polymeric emulsion binder, nanoscale silica particles, and optional additives including light blockers, titanium dioxide, light absorbers, viscosity modifying agents, or other additives. A latex emulsion, typically in an aqueous medium, is applied to the surfaces of the fine particulate layer 16 to provide an emulsion coating which coats the particles and at least partially impregnates the gaps between the fine particles, and upon curing stabilizes the structure. Suitable polymer resin in emulsion form may include acrylics, polyvinylacetate, acrylate/styrene copolymers, acrylate/vinyl acetate copolymers, chloroprene, butyl rubber, styrene-butadiene copolymers, SEBS, and mixtures thereof. Polyvinylacetate and acrylics are preferred.

Nanoscale silica sol typically has a particle size of 0.1 to 100 nanometers (nm), preferably 1 to 50 nm, and more preferably 5 to 30 nm. Because of its small particle size, colloidal silica sol can play multiple roles in waterborne coating formulations. It has been found that amorphous nanoscale silica provides for good bond between the waterproofing membrane 10 and concrete cast against the membrane.

These composite benefits of the present invention are unexpected since the antisubmarine coating is extremely hard. It is difficult to measure accurately the penetration of such a hard surface, as the value is close to 0; so, instead of using penetration as a measure of hardness, the present inventors used Shore D hardness as the more applicable measurement. Shore D hardness is measured in accordance with ASTM D 2240-00 at ambient temperature (23 degrees Celsius) as further described below. A sample of the anti-submarine coating cast. The specimen was about 9-10 mm thick and had a diameter of 6-7 cm. The specimen was placed on a flat horizontal surface. The durometer was held in a vertical position with the indenter tip placed at least 12 mm from the edge. Sufficient pressure was applied to ensure contact between the presser foot and the specimen. After the presser foot was in contact with the specimen for one second the indicated reading was recorded. Five measurements were made, and the mean hardness value was calculated.

Bond strength is excellent even after the membrane has been immersed in water. To test this advantageous property, the present inventors cast concrete against a strip of the membrane 10 of the invention and allowed the concrete to cure for seven days. The assembly was then immersed in water for 30 days. The bond between the membrane 10 and concrete after a period of water immersion was measured and compared to that for an assembly that had not been immersed in water, and the bond was found to be very good. Without being bound by theory, the present inventors believe that amorphous nanoscale silica particles form hydration products in an alkaline environment (such as found in concrete which contains Portland cement). Amorphous nanoscale silica particles also increase the friction coefficient of the coating surface, which enhance blocking resistance as well as skid resistance properties.

A preferred anti-submarining nano-silica-containing coating layer 18 in the waterproofing membrane 10 of the present invention may be made by employing an acrylic emulsion with a small particle size, low viscosity and containing 100% acrylic polymer latex. The coating layer 18 formed by acrylic latex which has the following properties: resistance to discoloration, resistance to film degradation over time, resistance to stickiness, a glass transition temperature of 10-20 degrees Celsius, and more preferably 10-30 degrees Celsius. The resulting coating is a flexible, waterproof coating that tends to strengthen the inorganic particle layer 16, protecting it from water, grease, rough handling. The resulting coating should preferably not bond to itself when folded and subjected to temperatures extending upwards to seventy degrees Celsius. A low viscosity acrylic emulsion makes it easy to apply to the fine inorganic particle 16 by suitable means such as spraying, brushing, rolling, and the like. The amount of the latex applied should be controlled to achieve good coverage and at the same time avoid impairing coating quality.

Another preferred polymeric emulsion coating for use in film coating layers 18 of the membrane 10 is a polyvinyl acetate emulsion, which provides excellent film forming, adhesion, and bonding abilities. Other benefits of using polyvinyl acetate emulsion include good color stability and good stability to oxygen and ultraviolet light, which in turn result in good resistance to exterior exposure, excellent resistance to grease and oil, good adhesion to most substrates, and good emulsion stability when contacted by acidic materials or polyvalent ions.

The anti-submarining coating layer or layers 18 of membranes 10 of the present invention further comprise nano-silica particles, as previously described; and, in a preferred embodiment, the nano-silica particles are blended with one or more film-forming polymeric binders mentioned earlier. Nanoscale silica particles typically have a particle size of 0.1 to 100 nanometers (nm), preferably 1 to 50 nm, and more preferably 5 to 30 nm. Because of its small particle size, nano-silica particles can play multiple roles in waterborne coating formulations. It has been found that amorphous nanoscale silica provides for good bond between the waterproofing membrane 10 and concrete cast against the membrane, even after the membrane has been immersed in water.

Further exemplary waterproofing membranes 10 of the present invention may comprise two or more sequentially applied anti-submarining nano-silica coating layers (18) with each coating layer comprising a film-forming polymeric emulsion containing nano-silica for additional ease in the formation of water-tight overlaps between adjacent membranes 10. For example, where two or more film coating layers 18 are employed to coat over the cement particulate layer 16 of the membrane 10, it is preferred that the outermost-situated of the film coating layers 18 (i.e., the one furthest from the inorganic particle layer 16) have a higher film-forming-polymer:nano-silica ratio (by weight). The outermost coating layer 18 should possess minimal dust on the outer coating surface (as dust tends to impede or defeat water-tight seaming at overlaps between membranes). Thus, further embodiments comprise at least two anti-submarining nano-silica-containing coating layers (18), the outermost one of which contains a higher film-forming-polymer:nano-silica ratio (by weight).

The ratio of film-forming-polymer:nano-silica as well as the dry film coverage weight in each of the film coating layers 18 depends upon the nature of the film-forming-polymer or blend of polymers used, as well as the commercial nano-silica product used for making the coating composition 18. The film forming-polymer to nano-silica ratio (polymer:nano-silica) of exemplary coating layers 18 of the membrane 10 of the invention should preferably in the range from 1:4 to 4:1 based on weight percentage (dry solids) depending on the nature of the polymeric emulsion and nano-silica used. The dry coating weight should preferably be 5-20 grams per square meter, and, more preferably, 8-15 grams per square meter.

Thus, in an exemplary embodiment, the waterproofing membrane has an anti-submarining coating layer 18 which comprises polyvinyl acetate (PVAc) as the at least one film-forming polymer and nano-silica particles, wherein the preferred PVAc:nano-silica ratio is 1:1 to 1:4. In another exemplary embodiment, the waterproofing membrane has an anti-submarining coating layer 18 which comprises an acrylic polymer as the at least one film-forming polymer and nano-silica particles, wherein the preferred acrylic:nano-silica ratio is 4:1 to 1:1, based on dry weight solids.

To further improve the whiteness and sunlight blocking property of anti-submarining coating layer 18 and/or PSA layer 14, white pigments can be added. For the outer coating layer 18, preferred white pigments include titanium dioxide, zinc oxide, aluminum trioxide, zinc sulfide, lithopone, and the like. More preferably, rutile titanium dioxide pigment can be used. A preferred rutile titanium dioxide pigment is available from DUPONT under the TI-PURE® R-960 brand name. To disperse white pigments in the film coating composition, a dispersing agent can be used. A suitable dispersing agent is available from ELEMENTIS SPECIALTIES under the brand name NUOSPERSE™ FN211.

As previously mentioned, an UV absorber can be added into the waterproofing membrane to provide protection from UV degradation, such as in the anti-submarining coating layer 18 and/or PSA layer 14. In addition, one or more light stabilizers can be added together with one or more UV absorbers to improve protection. An example of a commercially available UV absorber is sold by DOUBLE BOND CHEMICAL IND. CO. LTD, under the brand name CHISORB™ 5392E), which is believed to be a liquid UV absorber blended with HALS (hindered amine light stabilizer) for use in coatings. This is a solvent-free, aqueous UV absorber emulsion. It has a liquid form at room temperature which facilitates handling compared to benzotriazole UV absorbers, and it provides a broad UV absorption. Another preferred water soluble UV absorber is a benzophenone-4 broad band UV filter supplied by ISP TECHNOLOGIES, INC., under the brand name ESCALOL™ 577.

A preferred waterproofing membrane of the present invention comprises: a carrier layer comprising two major faces; a pressure-sensitive adhesive layer having an average thickness of 0.05 to 2.0 mm as defined between two major faces, one of which is attached to one of the carrier layer major faces, the pressure-sensitive adhesive layer further having a penetration greater than 30 decimillimeters (dmm) (150 g., 5 sec., 70° F.) as measured according to ASTM D 5-73, the pressure-sensitive adhesive comprising butyl rubber adhesive, polyisobutylene adhesive, butyl adhesive, acrylic adhesive, styrene-isoprene-styrene (SIS) adhesive, styrene-ethylene-butylene-styrene (SEBS) adhesive, styrene-butadiene-styrene (SBS) adhesive, styrene-butadiene rubber (SBR) adhesive, or combination thereof; an inorganic particle layer comprising individual particulate bodies having an average size of 70 μm to 450 μm, the inorganic particle layer being formed by partially embedding the particulate bodies into the second major face of the pressure-sensitive adhesive layer (opposite the major face attached to the carrier layer) whereby a portion of the particulate bodies remain un-submerged, the individual particulate bodies comprising partially hydrated cement, hydrated cement, calcium carbonate, silicate sand, sand, amorphous silica, slag, alumina trihydrate, bottom ash, slate dust, granite dust, or mixtures thereof; and an anti-submarining coating layer, having an average thickness of 0.003 to 0.011 mm, attached to un-submerged portions of the inorganic particulate bodies to prevent total embedding of individual particulate bodies within the pressure-sensitive adhesive layer when the membrane is rolled up or unrolled, the coating layer being formed by coating the inorganic particle layer with an emulsion comprising nano-silica particles and at least one film-forming polymer and allowing the coating layer to dry upon the un-submerged individual particulate bodies, the coating layer after drying having a Shore D hardness in the range of 50-90, more preferably in the range of 60-90, and most preferably in the range of 70-90, measured at 23 degrees Celsius, in accordance with ASTM D 2240-00, the at least one film-forming polymeric material being selected from acrylic, polyvinylacetate, acrylate/styrene, acrylate/vinyl acetate, chloroprene, butyl rubber, styrene-butadiene, SEBS, or mixtures thereof; and wherein the ratio of the at least one film-forming polymeric material to nano-silica particles, in terms of dry film coating weight, is in the range of 1:4 to 4:1 (based on dry weight solids).

The present invention provides exemplary methods for manufacturing waterproofing membranes. The PSA can be hot-melt coated onto a carrier using a roll coater, slot die coater, or curtain coater. One may also begin with a carrier/PSA laminate (12/14) and embed the inorganic particulate bodies 16 into the PSA layer 14 to create the inorganic particle layer 16 while the PSA is thermally hot and softened, using particles having an average particle thickness or diameter which is less than the average thickness of the PSA layer 14. The loose particles should be removed from the particle layer 16 using gravity, vacuum, brushing, or a combination thereof, and the anti-submarining nano-silica layer is formed over the partially-embedded inorganic particle layer 16, preferably by coating with an aqueous emulsion comprising at least one film-forming polymer and nano-silica particles. In a further exemplary method, the at least one polymeric coating layer is dried, and the resultant waterproofing membrane is wound into a roll without a removable release sheet.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

EXAMPLE 1

A waterproofing membrane of the present invention may be created by coating, for example, a carrier sheet which comprises 30 mil high density polyethylene (HDPE) with a 10 mils thickness coating of a synthetic pressure-sensitive (PSA) adhesive such as SEBS, SBS, SIS, SBR, etc., which is used for making PSA layers. A PSA comprising SIS polymer is preferred.

The adhesive coated sheet is placed in an air-circulation oven at 70 degrees Celsius for one hour to soften the PSA layer, and then a fine inorganic particulate layer is created upon the face of the PSA layer by embedding fine inorganic particles using a pressure roller into the PSA.

The membrane is then placed back into the oven for about 30 minutes, and more fine particles are scattered over the face of the PSA layer and the pressure roller is again used to embed the particles into the face of the PSA layer to ensure good coverage of fine particulate matter over the PSA layer. The excess loose particulates may be removed by gentle brushing.

Finally, the anti-submarining nano-silica coating comprising the aqueous polymeric emulsion and nano-silica is sprayed onto the inorganic particle layer to the desired wet coating weight. The polymeric emulsion anti-submarining nano-silica coating is allowed to dry at ambient temperature.

By following such a process, a four layer waterproofing membrane comprising HDPE carrier sheet (12), waterproofing pressure sensitive adhesive (14), fine inorganic particle layer (16), and at least one anti-submarining nano-silica coating layer (18) is produced.

EXAMPLE 2

Various testing procedures on the waterproofing membranes may be used as follows.

Testing Bond to Post-Applied Concrete. As waterproofing membranes are normally subject to exposure to sunlight prior the post application of concrete—against the membranes, it is highly desirable that such membranes maintain their ability to adhere fully to the concrete after such exposure. Adhesion of the membranes to concrete is tested by casting concrete against the outer face of 1.5 inch×6 inch (3.8 cm×15 cm) membrane samples, allowing the concrete to cure for seven days, then measuring peel adhesion with an Instron™ mechanical tester at a peel angle of 180° and a peel rate of 4 inches (100 mm) per minute. The bond strength to concrete is measured for samples not exposed to UV radiation (initial) and for samples exposed to UV radiation prior to casting concrete, where the UV exposure uses the EMMAQUA accelerated test in which the exposure corresponds to the equivalent of one month UV exposure (28 mj) or two months UV exposure (56 mj).

End lap bond performance (initial bond and long-term water immersion). A double-sided tape is used for bonding the roll ends to form a continuous waterproofing. (A single sided tape can be used if folded over lengthwise, but this requires additional time during actual construction jobs and is less preferred). Overlap roll ends of the membrane by a minimum 75 mm. Apply double-sided tape and fix the adhesive side on the overlap area of bottom membrane. Roll firmly to ensure complete adhesion without creases or voids. Peel off the release paper of the other side of double-sided tape and apply 2nd piece of membrane to the adhesive tape. Roll firmly to ensure complete adhesion. T-peel test is used to determine the bond performance of end laps after 24 h curing, peeling speed is 100 mm/min. Long term water immersion (i.e. one month) of end laps bond samples to check whether water will penetrate into the end laps and degrade the bond performance.

Testing Blocking Resistance Testing. Since waterproofing membranes are normally wound into a roll, it is highly desirable to ensure that one surface of the membrane does not strongly adhere to the other surface of the membrane. Otherwise, it will be difficult to unwind the roll. To test blocking resistance, a layer of 30 mil (0.75 mm) HDPE film is placed on the outer surface of a 2.0×6.0 inch membrane sample, a 3 pounds per square inch (psi) load is placed on top; then this assembly is placed in an oven at 65 degrees Celsius for 1 week. After cooling to room temperature, each sample is tested with a T-peel test using an Instron™ mechanical tester using a cross head speed of 4 inches per minute. Blocking is measured as pounds per linear inch (pli).

Testing Water Immersion Testing. Since waterproofing membranes may be immersed in water after being cast against concrete, it is highly desirable that such membranes maintain their ability to adhere to concrete after such water exposure. An extremely severe test has been devised to illustrate the exceptional performance of membranes of the present invention. Adhesion of the waterproofing membranes to concrete is tested by casting concrete against the outer face of membrane samples having dimensions 1.5 inch×6 inch (3.8 cm×15 cm), allowing the concrete to cure for seven days, immersing this membrane/concrete assembly in water for 90 days; and then measuring the peel adhesion with an Instron™ mechanical tester at a peel angle of 180° and a peel rate of 100 mm per minute. Water may infiltrate between any of the interfaces of the assembly including the concrete/anti-submarining coating interface, the anti-submarining coating layer/particulate layer interface, or the particulate layer/pressure sensitive adhesive layer interface. This test is considered severe because in normal usage of the membranes these interfaces would not be exposed to infiltration by water.

LT Flexibility Testing. To test flexibility at low temperature, the following test is performed on the waterproofing membranes. The outer face of the sample (50×100 mm) is bent 180 degrees, so that the edges of membrane samples overlap along their width dimension (50 mm); and the edges are fixed with flush clips or staples or 10 mm wide tape. The bending instrument should have a distance between top and bottom plates three times the thickness of the specimen. With the top and bottom plates of the bending device open, the membrane sample is placed flat onto the bottom plate, with fixed overlap side toward the shaft, and the distance between sample and the shaft is 20 mm. The bending device together with the sample are put into the cold chamber maintained at −25 degrees Celsius temperature for 1 hour (or two hours), then the top plate is pressed for one second toward the bottom plate to the tuned spacing, and then the samples are removed from the device. After the sample is returned to room temperature, the bent sample is observed to detect whether it is broken or sustained cracks over the bent area.

Lateral Water Migration Resistance Testing. Lateral Water Migration Resistance is the prevention of water movement between a blind side waterproofing system and a concrete structure. Water may pass through a waterproofing system if it is punctured by rebar or other sharp objections which create a tear or void prior to or during concrete placement. If water is free to travel laterally between the waterproofing membrane system and the concrete, then it will find its way into the building. A waterproofing system that prevents lateral water migration between the waterproofing membrane and the foundation is essential to keeping the building interior dry. One 10 mm diameter hole is prepared at the center of the sample to simulate a breach of the waterproofing membrane. Concrete is cast onto the membranes and allowed to cure 7 days before hydrostatic head pressure testing. The pressure is held for 24 hours (h) at 58 pounds per square inch (psi), then 4 h at 72 psi, and 4 h at 87 psi. Lateral Water Migration test results are reported as [Pass/Fail]; Pass is defined as when ultimate pressure step is achieved; Fail is defined as water leaking out through specimen or water present between the membrane and concrete.

Heat Aging Testing: Three 100 mm×50 mm membrane samples are hang vertically in the oven maintained at 70° C. temperature for 2 hours, minimum spacing between samples are bigger than 30 mm. After the test, take the sample out and observe whether there is any slip, sag or dripping occurring on the membrane samples.

Results of various testing on two exemplary waterproofing membranes of the present invention are shown in Table 1 below. The pressure-sensitive adhesive (PSA) layers were made using SIS. In one of the membranes, the film coating layer was made from an aqueous emulsion comprising an acrylic as the film-forming polymer in combination with the nano-silica. In the second membrane, the film coating layer was made from an aqueous emulsion comprising polyvinyl acetate as the film-forming polymer in combination with the nano-silica.

TABLE 1

|  | Acrylic/Nano-silica (4:1 by weight) | PVAc/Nano-silica (1:3 by weight) |
| --- | --- | --- |
| Anti-submarining coating dry Wt (g/m$^2$) | 11.0 | 9.0 |
| Initial BTC (N/mm) | 2.6 | 2.8 |
| BTC after three month water immersion (N/mm) | 2.1 (14/16) | 2.2 (14/16) |
| Blocking | Fall off | Fall off |
| End lap bond (N/mm) | 0.6 | 0.7 |
| End lap bond after one month water immersion | 0.7 | 0.8 |
| BTC after 28 MJ/m$^2$ | 2.7 | 3.3 |
| EMMAQUA 56 MJ/m$^2$ Exposure (N/mm) | 1.8 | 1.9 |
| LT Flexibility (−25° C.) | No crack | No crack |
| Heat Aging (70° C., 2 hours) | No slip, sag and dripping | No slip, sag and dripping |
| Lateral Water Migration | Pass | Pass |

(14/16) = failure at layer 14/layer 16 interface

Both formulations exhibit excellent initial bond to concrete, bond to concrete after UV exposure, very good blocking resistance, and good retention of bond to concrete after three months of water immersion. Both formulations showed good end lap bond strength and retention of end lap bond after one month water immersion. The end lap bond sample after water immersion is peeled and the interface is dry. Both formulations showed excellent low and high temperature stability, and no water penetration happened after 0.6M Pa water penetration testing.

EXAMPLE 3

Penetration measurements were made as described above for formulations comprising a polyvinyl acetate emulsion and nano-silica as well as for formulations comprising an acrylic emulsion and nano-silica. For each of these embodiments, the effects of dry polymer to nano-silica ratios on Shore D were analyzed with respect to polyvinyl acetate (PVAc) and Acrylic, on the one hand, and nano-silica on the other. The results are summarized in Table 2 below.

TABLE 2

|  | Average Shore D Hardness |
| --- | --- |
| PVAc:Nano-silica (1:2.2) | 85 |
| PVAc:Nano-silica (1:3) | 86 |
| PVAc:Nano-silica (1:3.7) | 87 |
| Acrylic:Nano-silica (3.8:1) | 55 |
| Acrylic:Nano-silica (2.5:1) | 60 |
| Acrylic:Nano-silica (1.3:1) | 77 |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

What is claimed is:

1. A pre-applied waterproofing membrane, comprising:
    a carrier layer;
    a pressure-sensitive adhesive layer coated onto a major surface of the carrier layer;
    an inorganic particle layer formed of individual particulate bodies partially embedded within a major surface of the pressure-sensitive adhesive layer; and
    a silica-containing anti-submarining layer coated on unsubmerged portions of the individual particulate bodies to prevent the individual particulate bodies from becoming totally embedded or submerged within the pressure-sensitive adhesive.

2. The pre-applied waterproofing membrane of claim 1, wherein the membrane has a peel adhesion of at least 2.0 N/mm when
    concrete is cast against an outer face of the membrane,
    the membrane-concrete assembly is allowed to cure,
    the cured membrane-concrete assembly is immersed in water for 90 days, and
    the peel adhesion is measured using a mechanical tester at a peel angle of 180° and a peel rate of 100 mm per minute.

3. The pre-applied waterproofing membrane of claim 1, wherein the pressure-sensitive adhesive layer has a penetration of greater than about 30 decimillimeters (dmm) (150 g., 5 sec., 70° F.) as measured according to ASTM D 5-73.

4. The pre-applied waterproofing membrane of claim 1, wherein the individual particulate bodies have an average size of 70 μm to 450 μm.

5. The pre-applied waterproofing membrane of claim 1, wherein the anti-submarining coating layer is an aqueous emulsion comprising nano-silica particles and at least one film-forming polymer.

6. The pre-applied waterproofing membrane of claim 5, wherein the nano-silica particles have an average size of 0.1 to 100 nanometers (nm).

7. The pre-applied waterproofing membrane of claim 5, wherein the nano-silica particles comprise amorphous colloidal silica.

8. The pre-applied waterproofing membrane of claim 5, wherein the anti-submarining coating layer has an average thickness of 0.003 to 0.011 mm.

9. The pre-applied waterproofing membrane of claim 5, wherein the anti-submarining coating layer after drying has a Shore D hardness in the range of 50-90, measured at 23° C., in accordance with ASTM D 2240-00.

10. The pre-applied waterproofing membrane of claim 5, wherein the film-forming polymer is selected from acrylic, polyvinylacetate, acrylate/styrene, acrylate/vinyl acetate, chloroprene, butyl rubber, styrene-butadiene, styrene-ethylene-butylene-styrene, or a mixture thereof.

11. The waterproofing membrane of claim 5, wherein, in the anti-submarining coating layer, the ratio of the film-forming polymer to nano-silica particles, in terms of dry film coating weight, is in the range of 1:4 to 4:1 based on dry weight solids.

12. The pre-applied waterproofing membrane of claim 1, further comprising crevices or openings formed in the anti-submarining coating layer to expose the inorganic particle layer.

13. The pre-applied waterproofing membrane of claim 1, wherein the individual particulate bodies have an average particle size that is smaller than an average thickness of the pressure-sensitive adhesive layer.

14. The pre-applied waterproofing membrane of claim 1, wherein the carrier layer comprises a polymeric film, fabric, or both.

15. The pre-applied waterproofing membrane of claim 1, wherein the pressure-sensitive adhesive layer comprises bituminous or synthetic adhesive or a combination thereof.

16. The pre-applied waterproofing membrane of claim 1, wherein the inorganic particulate layer comprises individual particulate bodies of partially hydrated cement, hydrated cement, calcium carbonate, silicate sand, sand, amorphous silica, slag, alumina trihydrate, bottom ash, slate dust, granite dust, or a mixture thereof.

17. The pre-applied waterproofing membrane of claim 14 wherein the carrier layer comprises HDPE film; the pressure-sensitive adhesive layer is selected from SEBS, SBS, SIS, or a mixture thereof; the inorganic particle layer comprises hydrated white cement particles; and the anti-submarining coating layer comprises acrylic polymer, polyvinyl acetate polymer, or a mixture thereof.

18. The pre-applied waterproofing membrane of claim 1 wherein the waterproofing membrane has a surface reflectivity of at least 55% when measured using a reflectometer.

19. A waterproofing membrane for post-cast concrete applications, comprising:
- a carrier layer;
- a pressure-sensitive adhesive layer having an average thickness defined between a first major face and a second major face, wherein the first major face is attached to the carrier layer;
- an inorganic particle layer comprising individual particulate bodies partially embedded into the second major face of the pressure-sensitive adhesive layer, wherein portions of the individual particulate bodies are not submerged within the pressure-sensitive adhesive layer, wherein the individual particulate bodies have an average particle size that is smaller than the average thickness of the pressure-sensitive adhesive layer; and
- an amorphous colloidal silica-containing anti-submarining coating layer coated on the un-submerged portions of the individual particulate bodies to prevent total embedding and/or submergence of individual particulate bodies within the pressure-sensitive adhesive layer when the membrane is rolled up or unrolled.

* * * * *